United States Patent
Mustajarvi

(10) Patent No.: US 10,362,503 B2
(45) Date of Patent: Jul. 23, 2019

(54) COMMUNICATION NETWORK AGGREGATION TEST PAYLOAD

(71) Applicant: Nokia Solutions and Networks Oy, Espoo (FI)

(72) Inventor: Jari Pekka Mustajarvi, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/556,108

(22) PCT Filed: Mar. 13, 2015

(86) PCT No.: PCT/EP2015/055256
§ 371 (c)(1),
(2) Date: Sep. 6, 2017

(87) PCT Pub. No.: WO2016/146145
PCT Pub. Date: Sep. 22, 2016

(65) Prior Publication Data
US 2018/0279142 A1    Sep. 27, 2018

(51) Int. Cl.
*H04L 12/24* (2006.01)
*H04L 12/26* (2006.01)
*H04W 24/08* (2009.01)
*H04L 12/841* (2013.01)

(52) U.S. Cl.
CPC ......... *H04W 24/08* (2013.01); *H04L 41/5038* (2013.01); *H04L 43/024* (2013.01); *H04L 43/0888* (2013.01); *H04L 43/12* (2013.01); *H04L 47/283* (2013.01)

(58) Field of Classification Search
CPC . H04W 24/08; H04L 41/5038; H04L 43/0888
See application file for complete search history.

(56) References Cited

U.S. PATENT DOCUMENTS

2013/0114446 A1* 5/2013 Liu ..................... H04W 24/10
                                                              370/252
2014/0369329 A1   12/2014 Lee et al.
2015/0043617 A1   2/2015 Gan et al.

OTHER PUBLICATIONS

International Search Report and Written Opinion received for corresponding Patent Cooperation Treaty Application No. PCT/EP2015/055256, dated Nov. 12, 2015, 14 pages.

(Continued)

*Primary Examiner* — Mohammad S Anwar
(74) *Attorney, Agent, or Firm* — Squire Patton Boggs (US) LLP

(57) ABSTRACT

A first node (2) of a first network using a first radio access technology signals (SI) a second node (3) of a second network using a second radio access technology start and stop of a test data session and to send test data packets to a UE (1) in an aggregation mode via the second node (3) in the test data session. The UE (1) is associated with the second node (3). The test data packets comprise payload and an aggregation header including an indication that the payload comprises test data. The first node (2) determines (S4) a service level of the UE (1) with respect to the second node (3) based on a report on a throughput of the test data packets sent by the second node (3) in the test data session.

20 Claims, 6 Drawing Sheets

(56) References Cited

OTHER PUBLICATIONS

Intel Corporation, "Radio link failure handling for dual connectivity", 3GPP TSG RAN WG2 Meeting #84, R2-134271, San Francisco, USA, Nov. 2013, 4 pages.
3rd Generation Partnership Project, "Technical Specification Group Radio Access Network", Study on Multi-RAT joint coordination, 3GPP TR 37.870 V1.0.0, 22 pages.
Yoo et al., "An Opportunistic Relay Protocol for Vehicular Roadside Access with Fading Channels", Computer Science Department, University of California, Los Angeles, 10 pages.

* cited by examiner

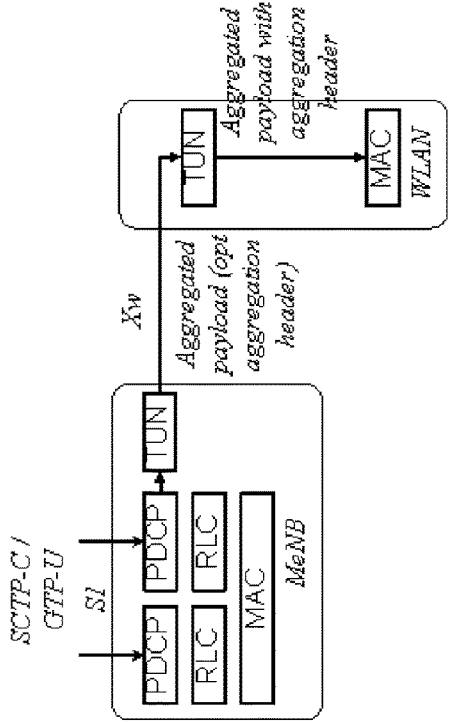
Fig. 3
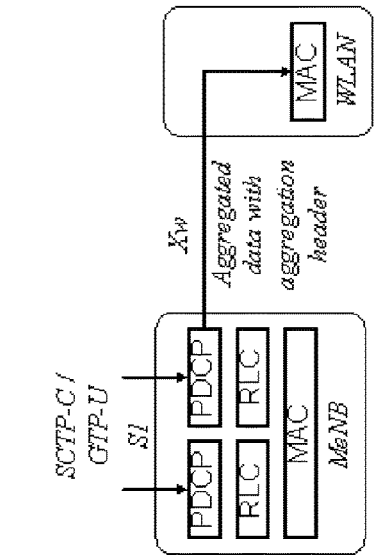
Fig. 4
Fig. 5
Fig. 6

| Aggregation mode (2 bits) | Bearer-Id (4 bits) | Test-Data (1 bit) | Opt eNB Addr (variable) |

Fig. 7

| Aggregation mode (2 bits) | Bearer-Id (4 bits) | Opt eNB Addr (variable) |

Fig. 8

| Any payload to be ignored | Aggregation header | WLAN LLC | 802.11 |

Fig. 9

| Destination MAC (6 bits) | Source MAC (6 bits) | Protocol-ID (2 bits) | Aggregation Header | LTE bearer (PDCP/RLC) | Aggregated payload |

Fig. 10

COMMUNICATION NETWORK AGGREGATION TEST PAYLOAD

RELATED APPLICATION

This application was originally filed as Patent Cooperation Treaty Application No. PCT/EP2015/055256 filed Mar. 13, 2015.

BACKGROUND OF THE INVENTION

Field of the Invention

The present invention relates to communication network aggregation test payload. For example, communication network aggregation concerns LTE—Wi-Fi aggregation.

Related Background Art

The following meanings for the abbreviations used in this specification apply:
3GPP Third Generation Partnership Project
5G 5th generation mobile network
AP Access Point
BSS Basic Service Set
BSSID BSS Identifier
CDMA Code Division Multiple Access
eNB evolved NodeB
HESSID Homogenous Extended Service Set Identifier
LLC Logical Link Control
LTE Long Term Evolution
MCS Modulation and coding scheme
MeNB Master eNB
MIMO Multiple Input Multiple Output
RRC Radio Resource Control
RSSI Received Signal Strength Indicator
RTT Round Trip Time
SeNB Secondary eNB
UE User Equipment
WiMAX Worldwide Interoperability for Microwave Access
WLAN Wireless Local Area Network For example, LTE Dual Connectivity feature allows a network to use both macro LTE eNB and micro LTE eNB (pico cell/small cell) together to deliver payload to a UE, such that traffic from one bearer can be delivered in an LTE network to the UE via a secondary eNB (SeNB) while other communication happens via a master eNB (MeNB). It is also possible to split a single bearer in an LTE network in the MeNB so that a portion of the payload is delivered via the SeNB and the rest via the MeNB. A similar mechanism is considered for an enhanced Dual Connectivity feature where a WLAN network (AP) may assume SeNB role.

SUMMARY OF THE INVENTION

The invention aims at acquiring accurate information on a service level that a UE can achieve on a radio access network aggregation such as a WLAN aggregation, at an aggregation point located in another radio access network e.g. complying with current or future 3GPP standards as well as non-3GPP standards such as WiMAX and CDMA.

This is achieved by the methods, apparatuses and computer program product as defined in the appended claims.

In the following the invention will be described by way of embodiments thereof with reference to the accompanying drawings.

BRIEF DESCRIPTION OF THE DRAWINGS

FIG. 3 shows a diagram illustrating protocol stacks of MeNB and WLAN for LTE/WLAN aggregation according to an implementation example of the invention.
FIG. 4 shows a diagram illustrating protocol stacks of MeNB and WLAN for LTE/WLAN aggregation according to an implementation example of the invention.
FIG. 5 shows a diagram illustrating a regular WLAN data packet in radio in aggregation mode according to an implementation example of the invention.
FIG. 6 shows a diagram illustrating a regular WLAN data packet in radio in aggregation mode according to an implementation example of the invention.
FIG. 7 shows a diagram illustrating an aggregation header according to an implementation example of the invention.
FIG. 8 shows a diagram illustrating an aggregation header according to an implementation example of the invention.
FIG. 9 shows a diagram illustrating a test data packet in radio in aggregation mode according to an implementation example of the invention.
FIG. 10 shows a diagram illustrating a packet generated by a WLAN interface out of aggregation data.

DESCRIPTION OF THE EMBODIMENTS

Referring to the feature of dual connectivity mentioned above, aggregated traffic contains an IP address allocated to a bearer of a first radio access technology, e.g. an LTE bearer, even when sent over a network using a second radio access technology, e.g. WLAN. No IP address may be assigned for WLAN leg when it is part of LTE/WLAN aggregation. Instead, a new layer 2 protocol or header may be created to allow routing of aggregated payload within a communication network. This protocol or header exists between a UE and an eNB of the LTE network and is conveyed over an aggregated WLAN interface (WLAN node). The receiving side, like UE, should route the aggregated payload to an LTE layer based on the layer 2 aggregation header. The LTE layer inputs the contained aggregated payload to a correct protocol entity like PDCP and finally data is passed to an IP layer for normal routing as it would have arrived from an LTE modem. This allows the payload to retain LTE assigned IP address all the time, independent whether it was delivered via LTE or WLAN bearer. Further, the UE retains a communication leg also over LTE radio so eNB can control UE behavior via LTE RRC signaling.

In order to reveal actual MCS (channel coding) that can be used in an interface of the network using the second radio access technology, e.g. the WLAN interface, there actually has to be some data transmission between UE and WLAN AP. UE and WLAN AP do exchange some messages during association and this already gives indication of service level. These messages however are typically sent using lowest supported bit rate to maximize correct delivery. Accurate service level requires message exchange using actual user payload that is being sent with highest possible bit rate.

WLAN rate adaptation algorithms are quite quickly able to find out best MCS. The MCS can be converted to instant bit rate when antenna configuration is known (number of independent spatial streams in case MIMO is used). It is possible also to measure achieved bit rate for the test data and alternatively provide this result.

Figure 1:
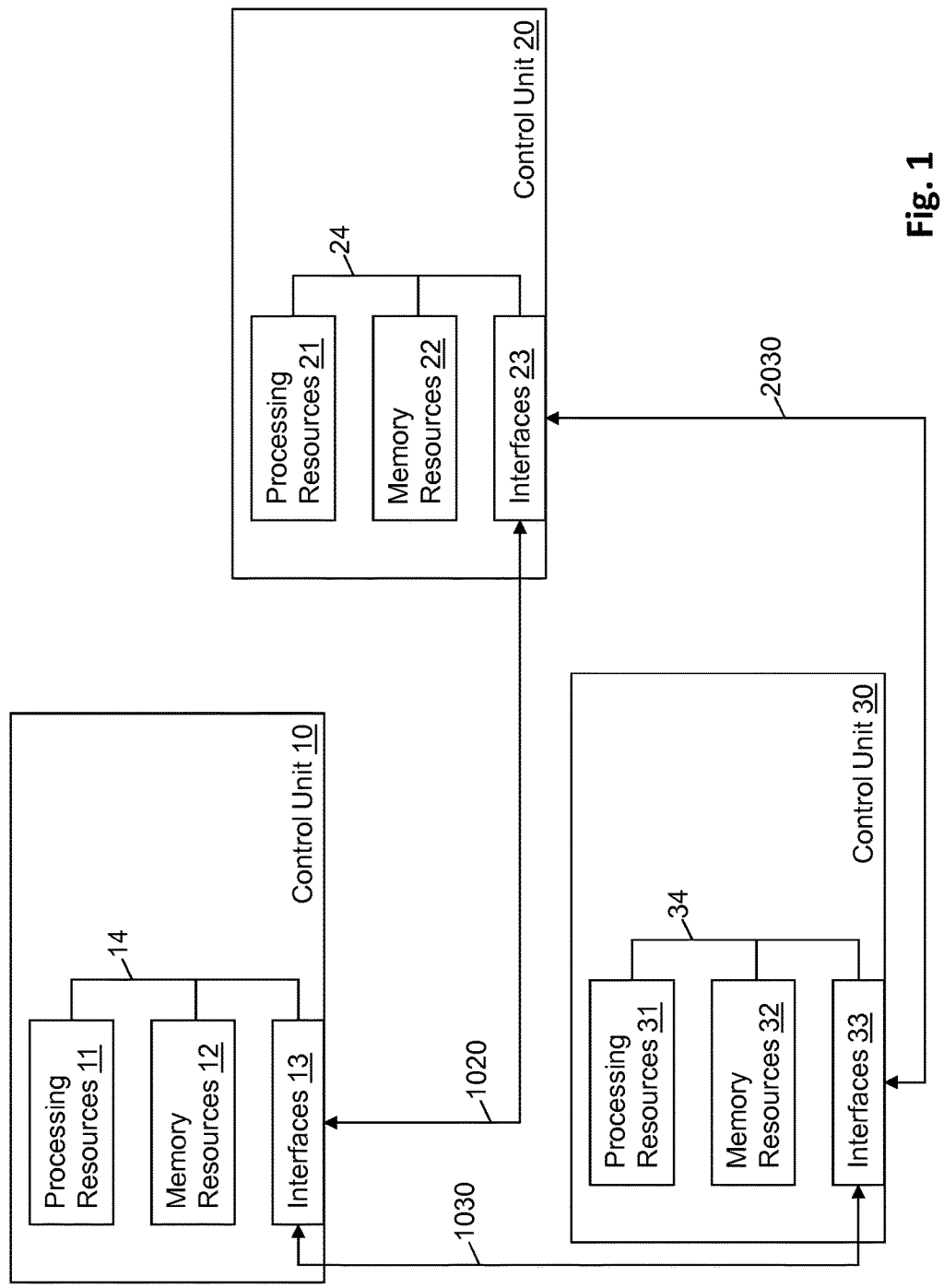
FIG. 1 shows a schematic block diagram illustrating a configuration of control units in which examples of embodiments of the invention are implementable.

As a preliminary matter before exploring details of various implementations, reference is made to FIG. 1 for illustrating a simplified block diagram of various electronic devices that are suitable for use in practicing the exemplary embodiments of this invention.

A control unit 10 which may be part of and/or used by a UE includes processing resources (e.g. processing circuitry) 11, memory resources (e.g. memory circuitry) 12 that may store a program, and interfaces (e.g. interface circuitry) 13 including a suitable radio frequency (RF) transceiver (not shown) coupled to one or more antennas (not shown) for bidirectional wireless communications over one or more wireless links 1020 with a control unit 20 and over one or more wireless links 1030 with a control unit 30.

The control unit 20 which may be part of and/or used by a first node of a first network using a first radio access technology, e.g. an eNB, includes processing resources (e.g. processing circuitry) 21, memory resources (e.g. memory circuitry) 22 that may store a program, and interfaces (e.g. interface circuitry) 23 including a suitable radio frequency (RF) transceiver (not shown) coupled to one or more antennas (not shown) for bidirectional wireless communications over one or more wireless links 1020 with the control unit 10 and including one or more links 2030 (e.g. Xw) for communicating with the control unit 30.

The control unit 30 which may be part of and/or used by a second node of a second network using a second radio access technology, e.g. a WLAN AP, includes processing resources (e.g. processing circuitry) 31, memory resources (e.g. memory circuitry) 32 that may store a program, and interfaces (e.g. interface circuitry) 33 including a suitable radio frequency (RF) transceiver (not shown) coupled to one or more antennas (not shown) for bidirectional wireless communications over one or more wireless links 1030 with the control unit 10 and including one or more links 2030 (e.g. Xw) for communicating with the control unit 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 12, 22, 32 is assumed to include program instructions that, when executed by the associated processing resources, enable the electronic device to operate in accordance with the exemplary embodiments of this invention, as detailed below. Inherent in the processing resources 11, 21, 31 is a clock to enable synchronism among the various apparatus for transmissions and receptions within the appropriate time intervals and slots required, as the scheduling grants and the granted resources/sub-frames are time dependent. The interfaces include both transmitter and receiver, and inherent in each is a modulator/demodulator commonly known as a modem.

In general, the exemplary embodiments of this invention may be implemented by computer software stored in the memory resources 12, 22, 32 and executable by the processing resources 11, 21, 31, or by hardware, or by a combination of software and/or firmware and hardware in any or all of the devices shown.

In general, the various embodiments of a UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22, 32 may be of any type suitable to the local technical environment and may be implemented using any suitable data storage technology, such as semiconductor based memory devices, magnetic memory devices and systems, optical memory devices and systems, fixed memory and removable memory. The processing resources 11, 21, 31 may be of any type suitable to the local technical environment, and may include one or more of general purpose computers, special purpose computers, microprocessors, digital signal processors (DSPs) and processors based on a multi core processor architecture, as non limiting examples.

Figure 2:
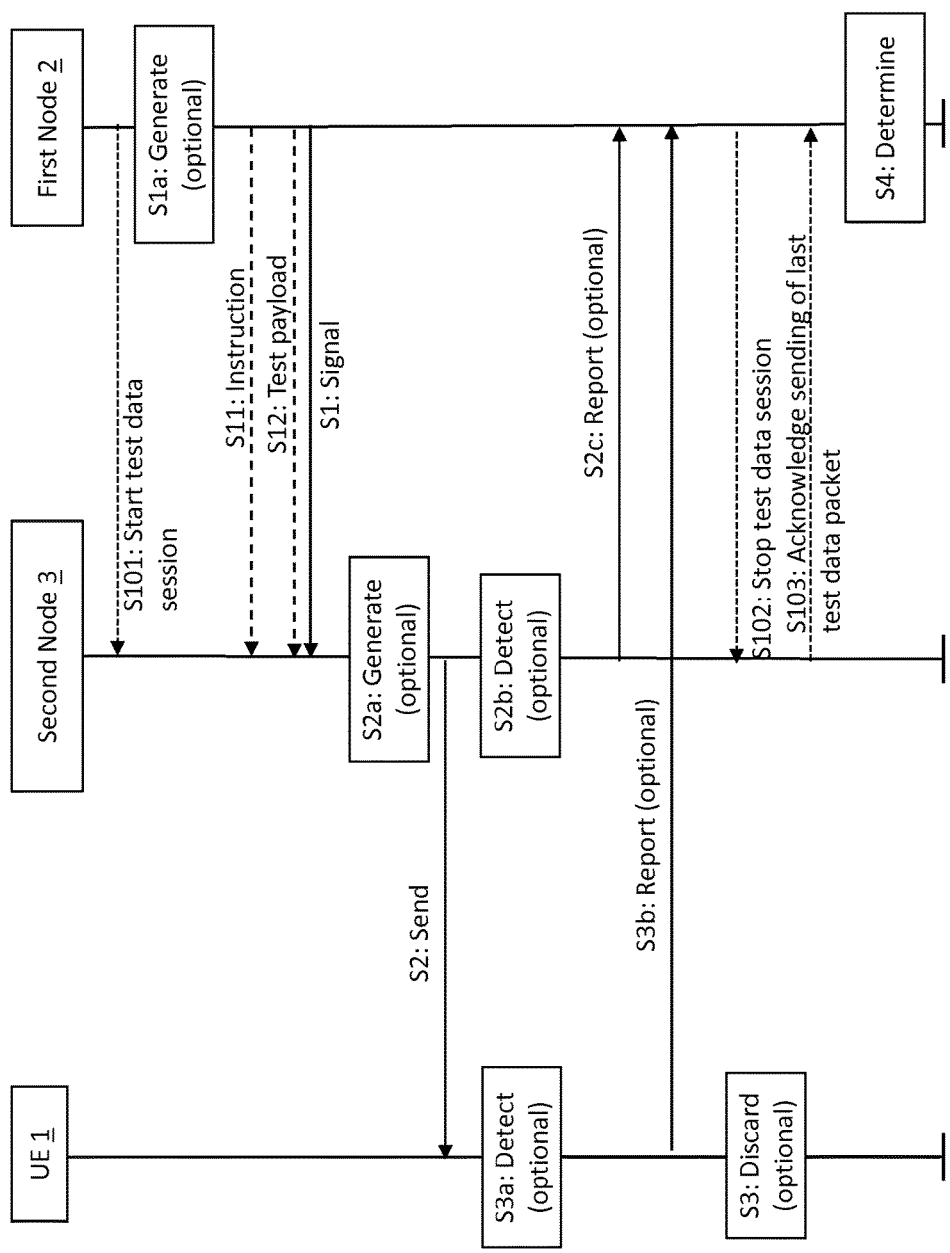
FIG. 2 shows a signaling diagram illustrating signaling according to an embodiment of the invention.

FIG. 2 shows a signaling diagram according to an embodiment of the invention, illustrating signaling between a UE 1, a first node 2 of a first network using a first radio access technology, e.g. complying with current or future 3GPP standards such as LTE or 5G and current or future non-3GPP standards such as WiMAX or CDMA, and a second node 3 of a second network, e.g. WLAN, using a second radio access technology different from the first radio access technology. The UE 1 may include and/or use the control unit 10, the first node 2 may include and/or use the control unit 20, and the second node 3 may include and/or use the control unit 30.

It is assumed that aggregation has been set up between the first node 2 and the second node 3 or at minimum the first node 2 can reach the UE 1 via the second node 3.

In step S1, the first node 2, in an aggregation mode, signals the second node 3 start and stop of a test data session and to send test data packets including payload and an aggregation header including an indication that the payload comprises test data to the UE 1 that is associated with the second node 3, via the second node 3. According to an example embodiment of the invention, the test data is to be discarded by the UE 1.

Optionally, in step S1 the first node 2 signals to the second node 3, that a report on a throughput based on the test data packets is to be sent to the first node 2, either by the second node 3 or the UE 1.

Discarding the payload here means that the UE 1 ignores the payload such that it is discarded in an aggregation handler of the UE 1. In other words, test data of the test data packets addresses only the aggregation handler and the aggregation handler does not pass it upwards to any LTE protocol (RLC/PDCP) or IP layer for decoding.

According to another example embodiment of the present invention, the indication of the test data in the aggregation header indicates a test mode, i.e. is used for distinguishing between the test mode and an operational mode. The transmission of discardable test data as mentioned above specifies a certain test mode.

The first node 2 signals the start and stop of the test data session to the second node 3 or to the UE 1 by sending a start signal (S101) and a stop signal (S102) to the second node 3 or UE 1, or adding a flag in a message header used to carry data (e.g. test payload) tunneled to the second node 3, or adding an instruction to the aggregation header to UE 1.

It is noted that the data tunneled from the first node 2 to the second node 3 may comprise real end user data where the aggregation header indicates that the data belongs to the test data session for measuring throughput and/or round trip time (RTT). Alternatively, the data may be random test data to be used for throughput and/or RTT measurement and to be deleted locally.

Further, according to an implementation example, the first node 2 requests the report on the throughput from the second node 3 or from UE 1 by using the stop signal or using an independent intermediate signal for ad hoc report request.

Based on the above-mentioned ad hoc report request or stop signal, the first node 2 may calculate RTT for the transmission of the test data packets. When these signals are included into the aggregation header of a test data packet then the report is generated as soon as the respective test data has been delivered to the UE.

According to an example embodiment, the UE 1 informs the first node 2 directly by sending an RTT report via a bearer of the first network when it receives an RTT request e.g. included in the aggregation header. Alternatively, the UE 1 informs the second node 3 by sending the RTT report to the second node 3, and the second node 3 sends the RTT report to the first node 2. Alternatively, the second node 3 obtains the RTT request from the first node 2 and issues the RTT report to the first node 2 as soon as specific test data with respect to the RTT request has been delivered to the UE 1. The RTT report is generated as soon as UE MAC acknowledges reception of the specific test data.

According to an example embodiment, in step S1a, the first node 2 generates the test data packets including payload to be discarded and an aggregation header including an indication that the payload contained in the test data packets is to be discarded by the UE 1, and in step S1 sends the test data packets to the second node 3. The aggregation header may also include the above-described instruction that signals the start and stop of the test data session and ad hoc report request.

Alternatively, according to an example embodiment, in step S1, the first node 2 tunnels test payload and, optionally, an aggregation header including the indication to the second node 3. As described above, a tunnel header may include the flag which signals the start and stop of the test data session. Multiple signals S12 (see FIG. 2) may be used for conveying the test payload generated by the first node 2.

According to another example embodiment of the invention, the first node 2 tunnels a test load generation instruction to the second node 3 to generate test payload that is to be discarded by the UE 1. For example, as shown in FIG. 2, a signal S11 may be used for instructing the second node 3 to generate test payload. The test load generation instruction may signal start and stop of the test data session and also request ad hoc report.

In step S2, the second node 3 sends the test data packets to the UE 1.

According to an example embodiment, in step S2 the second node 3 forwards the test data packets received from the first node 2 to the UE 1.

Alternatively, according to an example embodiment, the second node 3 receives the test payload and, optionally, the aggregation header sent by the first node 2 in step S1. In step S2a, the second node 3 generates test data packets by including the test payload received from the first node 2 as payload into the test data packets and the aggregation header including the indication that the payload is test data and therefore to be discarded, e.g. after statistics and/or throughput calculation. The aggregation header may be generated by the second node 3 or may have been received from the first node 2.

According to another example embodiment of the invention, a test load generation instruction is received from the first node 2, the second node 3 generates the payload and the aggregation header based on the test load generation instruction, and includes them into the test data packets.

In step S2 the second node 3 sends the test data packets to the UE 1. In step S2a, the second node 3 may further include the above-described instruction into the aggregation header, that signals the start and stop of the test data session according to the test load generation instruction in signal S11. S11 indicates an amount of test data (test payload) to be generated, for example. A separate signal may be used to request ad hoc report for RTT calculation. The second node 3 may further request ad hoc reporting from the UE 1 or may generate the report itself based on a delivery acknowledgement to an immediate message to UE 1.

According to an example embodiment of the invention, the second node 3 provides throughput report to the first node on request, e.g. when receiving the stop signal (S102) or a signal explicitly requesting an intermediate report, or automatically after last test message (last test data packet) of the test data session has been delivered. In case the first node 2 calculates the throughput, the report comprises merely a signal with transmitted/lost data amounts.

According to an example embodiment, in step S2b, the second node 3 detects a throughput corresponding to a modulation and coding scheme usable for sending the test payload data packets to the UE 1, and in step S2c reports, to the first node 2, information on the throughput. In order to allow the first node 2 to estimate an available throughput based on the measurement other relevant factors may be included like channel utilization of the second network (e.g. WLAN channel utilization, BSSLoad) and metrics of the second network, as an indication of available resources in the second node 3.

In step S3, the UE 1 discards the payload of the test data packets sent in step S2 from the second node 3, based on the indication in the aggregation header that the payload is test data and therefore to be discarded, e.g. after statistics and/or throughput calculation.

According to an example embodiment, in step S3a the UE 1 detects the throughput based on the test data packets sent by the second node 3, and in step S3b reports information on the throughput to the first node 2.

According to an example embodiment of the invention, the UE 1 provides throughput report to the first node 2 on request based on the instruction in the aggregation header e.g. requesting an ad hoc report, or automatically after last test message (last test data packet) of the test data session has been received.

According to an implementation example of the invention, the UE report can be delivered to the first node directly or via the second node 3.

The throughput report provided by the second node 3 or the UE 1 can be
- actual achieved throughput during the test data session, and/or
- achieved MCS/last MCS used and optionally other resource factors like BSSLoad and WANMetrics, which are also available to UE 1 via WLAN beacon.

The report on the throughput may additionally contain a transmitted byte count or a lost byte count, and corresponding values may be provided by the second node 3 or by the UE. Actual throughput value itself may not be needed if the first node 2 calculates actual throughput itself based on the transmitted data amounts during the test session duration.

Further, the report signals end of test data transmission in the second network radio to the first node 2 to allow the first node 2 to calculate throughput of the test data session.

In step S4, the first node 2 calculates a service level of the second node 3 based on the report on the throughput reported from the second node 3 and/or the UE 1.

According to an embodiment of the invention, the test data packets sent from the first node 2 create a test data session. In step S101, the first node 2 indicates to the second node 3 start of the test data session, and in step S102 stop of the test data session. The messages of steps S101 and S102 may be explicitly signaled to the second node 3 via dedicated signals or an indication may be included into a message header used to carry test payload between the first node 2 and the second node 3 in step S1. In step S103, the second node 3 acknowledges to the first node 2 when last test message (e.g. including the last test payload data packet) has been sent to the UE 1 to allow the first node 2 to calculate actual achieved throughput.

According to an implementation example of the invention, there is a test data session with the UE 1 if the UE 1 reports to the first node 2. In this case the UE 1 receives an explicit signal from the first node 2 or an indication in the aggregation header.

Conveying data to be discarded over the first node/second node interface is beneficial for the first node 2 to measure throughput itself in order to cover complete path between UE-second node-first node.

According to a further embodiment of the invention, the UE 1 reports achieved throughput/MCS using RRC to the first node 2. The aggregation header includes a separate element to indicate start and stop of the test payload aggregation (e.g. test data session), similar to the indication to the second node 3 described above. The UE 1 reports MCS/throughput over the test data session using RRC after the last test payload aggregation packet in the test data session has been received. The element may also include packet numbering to detect packet loss. UE 1 may also just signal to the first node 2 over RRC when last test message of the test data session has been received, allowing the first node 2 to calculate achieved throughput. Instead of using RRC any other protocol between UE 1 and first node 2 may be equally used, also via second node 3.

It is to be noted that the UE 1, in the aggregation mode, may also receive test data packets from the first node 2 which include payload to be discarded and a corresponding indication in the aggregation header.

As described above, an aggregation header is delivered to the UE 1 within the test data packets, which has been added by the first node 2 or by the second node 3 according to an instruction from the first node 2. The aggregation header binds the test data packets from the second network to first network interface in the UE 1. After test data statistics for throughput calculation have been updated by the UE 1, the payload in the test data packets is discarded in the UE 1.

According to an example embodiment, the indication comprises a value set in a data field added into the aggregation header, which will be described by way of an implementation example of the invention in more detail below.

According to an example embodiment, the indication comprises a predetermined bearer identification set in a bearer identification field of the aggregation header, which will be described by way of an implementation example of the invention in more detail below.

FIG. 3 shows protocol stacks of a master eNB (MeNB) as an implementation example according to the invention of the first node 2, and a WLAN AP (WLAN) as an implementation example according to the invention of the second node 3.

According to the implementation example of FIG. 3, aggregated data with an aggregation header is sent over an Xw interface from MeNB to MAC layer of WLAN. Aggregation point e.g. source entity for aggregation may be above PDCP layer, within PDCP layer, within RLC layer or within MAC layer in MeNB, depending on aggregation solution deployed.

As mentioned above, the test data packets may be sent by the eNB using S12 signals. In this respect, it is not necessarily optimal to generate a single shot burst transmission to tune rate control algorithm and therefore to measure achieved throughput. In other words, if a burst of data (lots of data) is sent during a short time period then rate control algorithm in second node 3 may not yet find optimal MCS and only resources are consumed in the air interface without gain. It may be necessary first to generate few packets for example in 100 ms interval for a period like 1 second in order to derive an MCS value that can be used for data transmission and this would be the value on which throughput calculation is based. So, according to an implementation example of the invention, instead of sending one burst of S12 signals, few S12 signals are sent, then a few milliseconds is waited, and this is repeated. WLAN node tunes MCS accordingly and this may be reported as described above. Then a longer burst of S12 signals is generated to calculate actual throughput achieved as described above. For example, the rate control algorithm may comprise the Minstrel algorithm.

According to another implementation example, the test session may contain both S11 and S12 signals with respective signaling scenario: first S11 is used to tune MCS and then S12 is used to calculate actual throughput.

FIG. 4 illustrates another implementation example in which a tunnel is established between eNB and WLAN for aggregated payload sent over Xw interface. The WLAN adds the aggregation header to the payload according to instructions received during tunnel setup. It is also possible that the eNB builds the aggregation header and tunnels the aggregated payload and the aggregation header to the WLAN. According to another implementation example of the invention, the eNB tunnels a test load generation instruction to the WLAN which signals the WLAN to generate test payload and an aggregation header and to send test data packets including the generated aggregation header and the generated test payload to the UE.

According to an embodiment of the invention, the aggregation header (e.g. L2 or IP aggregation header) is used to convey test payload which is to be discarded when received, potentially without involving any IP level protocol or header.

According to an implementation example of the invention, an eNB orders a UE to associate to a WLAN AP, either to specific BSSID or among allowed BSSIDs or other network identifiers like HESSID, SSID and domain name. The eNB then sends test payload over the WLAN AP to a UE using an aggregation layer, to find out actual MCS and service level or actual throughput in short that the UE can achieve on WLAN aggregation before actually starting the aggregation with the UE. The UE discards the test payload. Communication of some data packets allows the transmitting WLAN AP to find out usable MCS (e.g. based on MAC layer acknowledgements). Discovered MCS or actual throughput is notified to the eNB by the UE via RRC protocol or by WLAN AP via an interworking eNB-WLAN interface, e.g. on request basis.

Transmission of test payload prevents the eNB from blindly starting to use the WLAN AP for aggregation. In case the service level would be bad, end user experienced QoS is negatively affected. Once the eNB is sure that WLAN can provide adequate service level then it starts transmitting actual payload over the WLAN. The MCS or throughput reporting then is based on actual payload and actions can be taken when needed. If the eNB decides to stop using WLAN due to bad service quality, it can again poll WLAN service quality time to time using the test payload.

Now reference is made to FIG. 5 and FIG. 6 illustrating a regular WLAN data packet in radio in aggregation mode according to an implementation example of the invention, as e.g. transmitted from the MeNB to the WLAN shown in FIG. 3.

The WLAN data packet includes aggregated LTE payload. If aggregation point is in LTE PDCP layer then the payload contains one or mode PDCP packets. If aggregation point is in LTE RLC layer then payload contains one or more RLC packets. If aggregation point is on top of PDCP layer then payload contains one or more end user application packets that are being sent over LTE.

Further, the WLAN data packet includes an aggregation header in L2 layer (aggregation header shown in FIG. 5) or an aggregation header within higher protocol layers like in IP layer (aggregation header shown in FIG. 6). The aggregation header identifies the LTE bearer which should process the aggregated packet, among other information like test data indication and test data signals (stop/start of the test data session, ad hoc report request).

L2 layer aggregation and IP layer aggregation differs in how UE is addressed: in L2 layer aggregation the eNB addresses UE using link layer MAC addressing where as in IP layer aggregation the eNB addresses UE using IP address allocated in WLAN network for the UE. L2 addressing does not require IP address allocation at all in the WLAN network for the UE. Aggregation header is same in both cases but its placement differs as seen in FIGS. 5 and 6.

WLAN LLC included in the WLAN data packet is a layer indicating a type of the contained packet and context (like Encapsulated Ethernet). For L2 layer aggregation the type directly indicates LTE/WLAN aggregation. For IP layer aggregation the type indicates plain IP packet and the protocol identifier in the contained IP header further indicates LTE/WLAN aggregation.

802.11 of the WLAN data packet is a WLAN 802.11 header indicating, inter alia, destination and source MAC addresses of communicating WLAN radios and also next hop (gateway) MAC address which communicates with the UE. In L2 layer aggregation the next hop is eNB itself while in IP layer aggregation it may be any intermediate router between WLAN and eNB. eNB is addressed using IP addressing in case of IP layer aggregation.

Now IP layer aggregation will be explained. FIG. 6 illustrates a regular WLAN data packet in radio in aggregation mode according to another implementation example of the invention. In this implementation example, a separate IP address is allocated to the UE in WLAN network and aggregated data (header and payload) is sent as IP payload. Comparing to L2 layer aggregation solution shown in FIG. 5, a difference is an additional IP header between WLAN LLC layer and aggregation header. IP protocol field in WLAN IP header indicates an aggregation packet and protocol type in WLAN LLC indicates regular IP packet, whereas in L2 layer aggregation of FIG. 5 the protocol type in WLAN LLC indicates aggregation packet directly.

Any signaling between UE and eNB via WLAN requires that eNB is able to address the UE to the WLAN. Since WLAN and eNB do not share any common identities the UE may need to exchange its WLAN identities with the eNB prior to aggregation. This may be for example UE WLAN MAC address in case of L2 layer aggregation and UE WLAN IP address once one has been assigned to the UE. eNB may prepare WLAN for aggregation and inform UE MAC address to it. WLAN may assign an IP address to the UE and respectively indicate this to eNB. Also if eNB assigns (temporarily) a user identity for the UE to be used in access to WLAN node then eNB may equally inform this identity to WLAN node. After this any of these identities may be used to address the UE in the WLAN from the eNB, depending on the implemented aggregation mechanism.

The WLAN data packet shown in FIG. 5 or 6 is routed to an aggregation entity within a device (e.g. eNB), here eventually to LTE driver and further to LTE modem if aggregation point is within the LTE protocol stack (MAC/RLC/PDCP). According to a first implementation example of the invention, an additional element is added to the above-described aggregation header. This element identifies the aggregation payload as aggregation data belonging to a specific LTE bearer or as test payload to be discarded locally. According to a second implementation example of the invention, as the aggregation header identifies the LTE bearer, such identifier could be used to indicate 'test' payload, for example via invalid or currently unused bearer id value like '0'.

FIG. 7 illustrates an aggregation header according to the first implementation example. The aggregation header as illustrated comprises fields for aggregation mode, bearer-id, test-data and optional eNB address if UE needs to address eNB via WLAN connection (e.g. for throughput reporting) and it is not otherwise aware of eNB address. This address may be a MAC or an IP address, depending on aggregation solution. In other words, this aggregation header has a separate indicator (test-data, indication that payload contained in the data packets is to be discarded by the user equipment) for test payload. If payload is test payload, the message is discarded locally by the UE in aggregation handler/layer. Aggregation mode indicating aggregation layer (like RLC or PDCP) in the LTE may be included too. The aggregation header is not limited to the shown fields and may comprise further parameters.

FIG. 8 illustrates an aggregation header according to the second implementation example. The aggregation header as illustrated comprises fields for aggregation mode, bearer-id, optional BSSID and optional eNB MAC. In other words, with this aggregation header an unused bearer-id (e.g. "0")

or a dedicated bearer-id explicitly indicating test payload is assigned for test payload or an explicit aggregation mode value indicates test payload. If payload is test payload, the message is discarded locally by the UE in aggregation handler/layer. BSSID and eNB address may be included into the aggregation header. Aggregation mode may be included too. The aggregation header is not limited to the shown fields and may comprise further parameters, such as elements to indicate test payload and required report of throughput, start and stop of test measurement session, as well as packet numbering to detect packet loss.

FIG. 9 illustrates a test data packet in radio in L2 layer aggregation mode according to an implementation example of the invention.

The test data packet may include payload, i.e. test payload to be discarded, and an aggregation header according to the above-described first or second implementation example, which is an L2 layer aggregation header identifying test payload. Even though test payload is discarded in UE the payload is counted for reporting (bytes received, bytes lost) to eNB in case UE does the reporting as described above.

The test data packet further includes WLAN LLC layer indicating the type of the contained packet, here an LTE/WLAN aggregation packet. 802.11 of the test data packet is a WLAN 802.11 header indicating, inter alia, destination and source MAC addresses.

When a WLAN modem presents the test data packet for upper layers, it constructs an Ethernet packet out of the LLC and 802.11 headers and payload, as illustrated in FIG. 10. An operation system routes the Ethernet packet to any process which has registered itself as handler of LTE/WLAN aggregation as indicated by the protocol id if L2 layer aggregation is used. Similarly if IP layer aggregation is used then IP layer routes the packet to aggregation handler.

Figure 11:
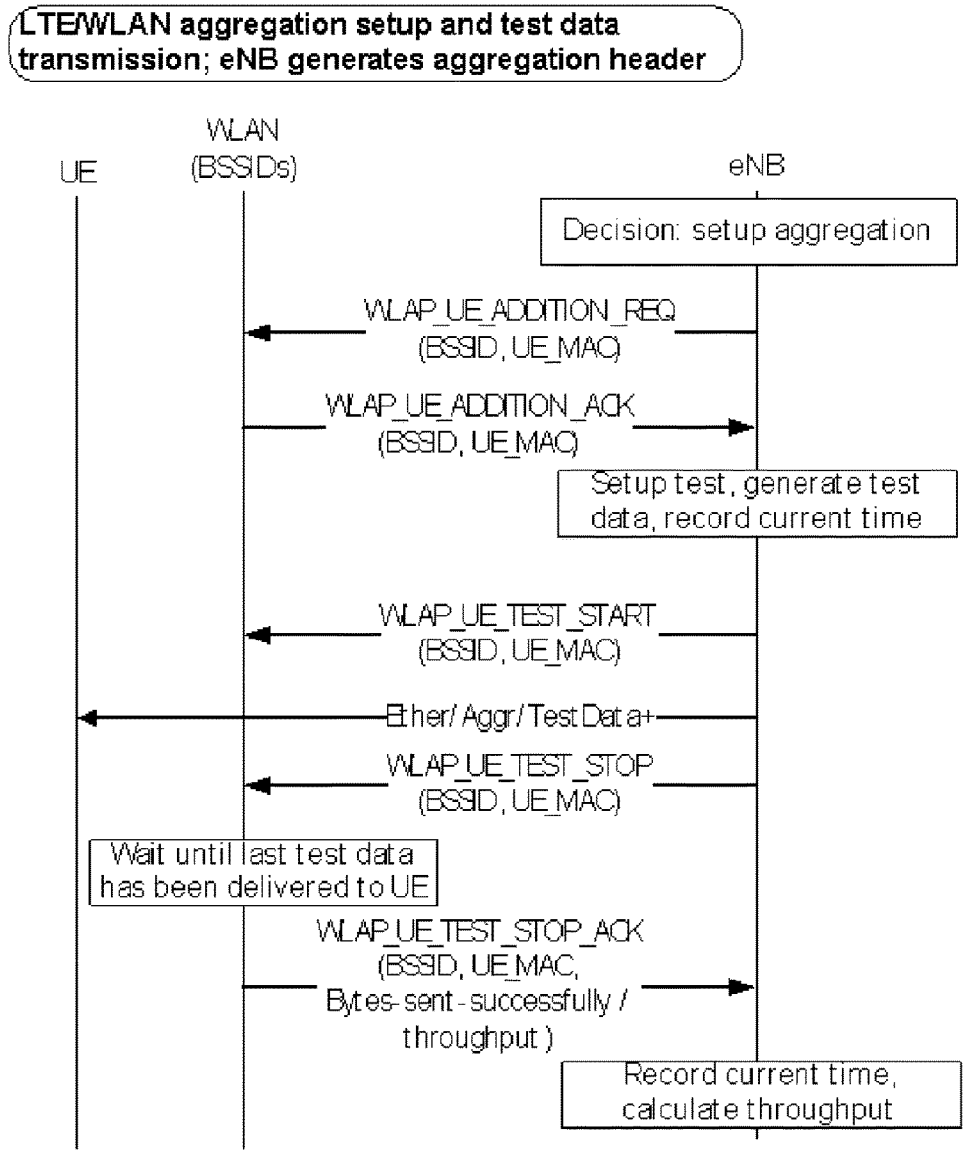
FIG. 11 shows a signaling diagram illustrating signaling according to an implementation example of the invention.

FIG. 11 shows a signaling diagram illustrating signaling between a UE, eNB and WLAN (BSSIDs) according to an implementation example of the invention in which the eNB generates an aggregation header. This implementation example corresponds to signaling including step S1a of FIG. 2.

The aggregation point is in the eNB. Once aggregation has been setup with the UE, the eNB generates an aggregation header and adds it to the test data packet and delivers the test data packet directly to the WLAN, and the WLAN forwards it to the UE, according to the signaling flow S1a→S1→S2 of FIG. 2.

Further, as explained above, according to an implementation example of the invention, separate signals mark the start of a test payload measurement session and the end of the test payload measurement session. As shown in FIG. 11, before the eNB starts a test payload measurement session by sending a message "WLAP_UE_TEST_START" to the WLAN, the eNB sets up a test, generates test data (test data packets (test payload data packets)) and records a current time. After having sent all the test data to the WLAN, the eNB stops the test payload measurement session by sending "WLAP_UE_TEST_STOP" to the WLAN. The WLAN waits until the last test data packet has been delivered to the UE, and then sends an acknowledgment message "WLAP_UE_TEST_STOP_ACK" to the eNB. The eNB records the time when the acknowledgment message is received. This allows the eNB to calculate itself actual achieved throughput in the WLAN connection between UE and eNB.

In case the UE is to acknowledge receipt of last test data packet, it sends a message RRC_UE_TEST_STOP_ACK to the eNB, similar as the acknowledgment message "WLAP_UE_TEST_STOP_ACK" sent by the WLAN as described above.

Figure 12:
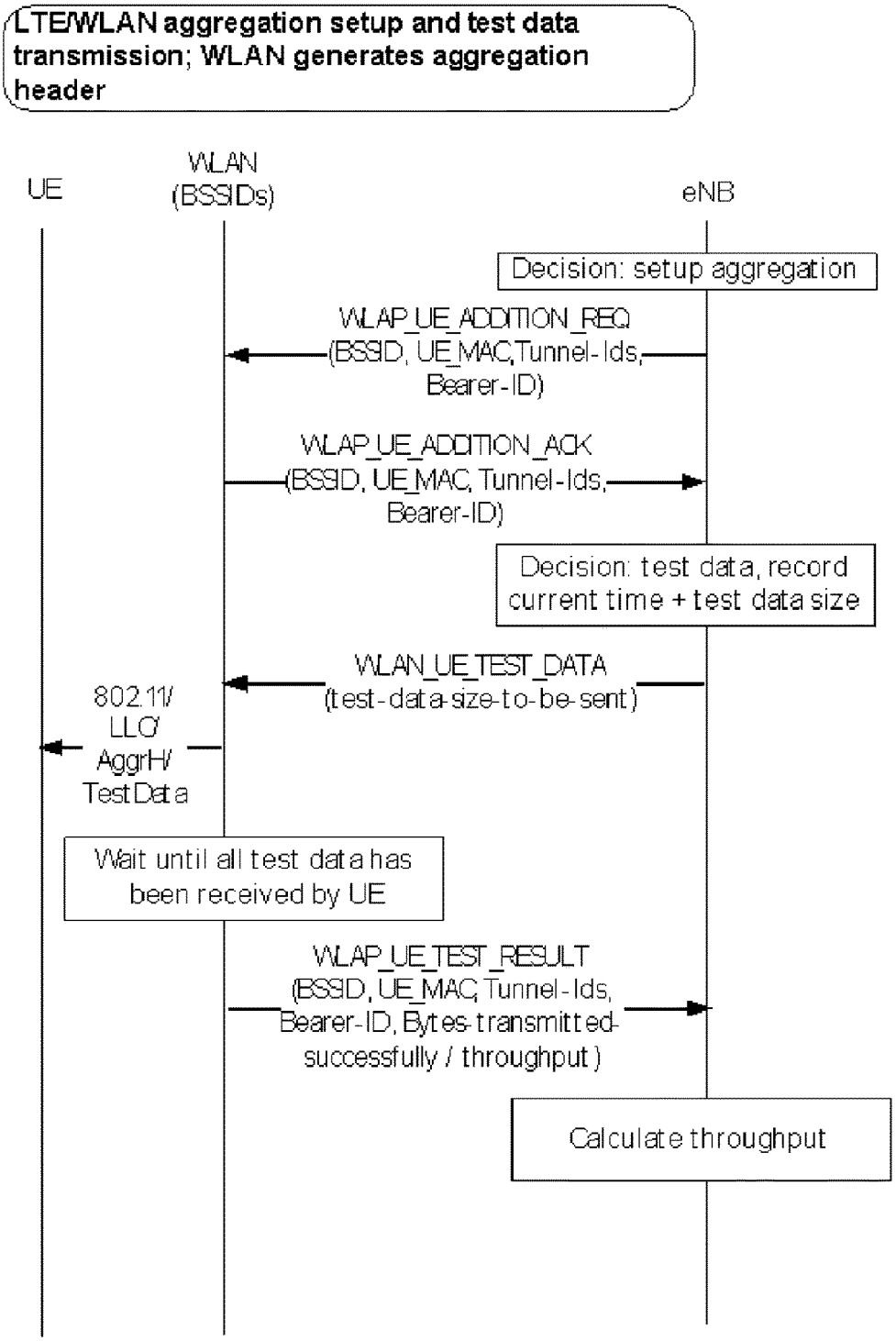
FIG. 12 shows a signaling diagram illustrating signaling according to an implementation example of the invention.

FIG. 12 shows a signaling diagram illustrating signaling between a UE, eNB and WLAN (BSSIDs) according to an implementation example of the invention in which the WLAN generates test data packets. This implementation example corresponds to signaling including step S2a of FIG. 2.

The aggregation point is in the eNB. When the eNB decides aggregation setup, it may setup a tunnel with the WLAN to transfer UE payload, including test payload. For example, the eNB sends a message "WLAP_UE_ADDITION_REQ (BSSID, UE_MAC, Tunnel-Ids, Bearer-ID)" to the WLAN. The WLAN responds with a message "WLAP_UE_ADDITION_ACK (BSSID, UE_MAC, Tunnel-Ids, Bearer-ID)". In other words, the eNB sets up a tunnel (e.g. a GTP tunnel) with the WLAN node (interface) to route test payload to the WLAN node in a message "WLAN_UE_TEST_DATA (length)". The tunneled data may contain an aggregation header from the eNB. Alternatively, the eNB may indicate to the WLAN node to generate aggregation test payload for the UE. Then the WLAN node adds the aggregation header to the generated aggregation test payload before forwarding test data packets to the UE, according to the signaling flow S1→S2a→S2 of FIG. 2.

As described above, if the WLAN assigns an IP address to the UE and the WLAN is aware of this then the eNB can use the IP address directly to send aggregation payload to the UE. The IP payload then is an aggregated data packet.

According to another implementation example of the invention, information on start/end of a test payload measurement is added into the aggregation header as an attribute. It may be also piggypacked into WLAN node as part of tunneling mechanism between WLAN and eNB as illustrated in FIG. 12. In FIG. 12, the eNB decides test data and records current time and test data size before tunneling the test data (test payload including the attribute) to the WLAN. The UE or WLAN node then respectively reports to eNB as soon as the last message of the test data session is received. According to the implementation example of the invention shown in FIG. 12, the WLAN sends a message "WLAP_UE_TEST_RESULT" to the eNB, when all test data packets have been received by the UE. This allows the eNB to calculate itself actual achieved throughput in the WLAN connection between UE and eNB.

It is noted that test payload can be triggered at any point during aggregation.

The test data payload depicted here may also contain real user payload exchanged in aggregation. In this case aggregation header indicates proper LTE bearer and payload is passed to this bearer process for normal handling. However the aggregation header fields used to indicate test session participation or signals and ad hoc reporting signal can still be used to request MCS or throughput reporting as if the payload would have been test payload to be discarded.

An advantage of at least one embodiment of the invention is that the eNB can verify an aggregation service level in a WLAN node before starting to use it for user payload. By running local aggregation level test payload avoids use of higher layer services for the same purpose, isolating all network effects into UE-WLAN-eNB connection and avoiding any backbone effects beyond LTE node. Thus, resources and bandwidth can be saved while maintaining good user experience.

According to an aspect of the invention, a first apparatus of a first network using a first radio access technology is provided. The first apparatus may comprise and/or use the control unit 20 shown in FIG. 1

The first apparatus comprises means for signaling a second apparatus of a second network using a second radio access technology start and stop of a test data session and to send test data packets to a user equipment in an aggregation mode via the second apparatus in the test data session, the user equipment being associated with the second apparatus, wherein the test data packets comprise payload and an aggregation header including an indication that the payload comprises test data, and means for determining a service level of the user equipment with respect to the second apparatus based on a report on a throughput of the test data packets sent by the second apparatus in the test data session.

According to an example embodiment of the invention, the first apparatus further comprises means for generating the test data packets including the payload and the aggregation header including the indication, and means for sending the test data packets to the user equipment via the second apparatus.

According to an example embodiment of the invention, the first apparatus further comprises means for tunneling data to the second apparatus to be delivered to the user equipment, the data indicating to the second apparatus that the data comprises test data. The data may be real end user data and the aggregation header indicates that the data belongs to the test data session for measuring throughput and/or round trip time (RTT), or the data may be random test data to be used for throughput and/or RTT measurement and to be deleted locally.

According to an example embodiment of the invention, the first apparatus further comprises means for signaling a test load instruction to the second apparatus instructing the second apparatus to generate the payload and the aggregation header of the test data packets.

According to an example embodiment of the invention, the first apparatus further comprises means for signaling the start and stop of the test data session to the second apparatus or to the user equipment by
  sending a start signal and a stop signal to the second apparatus or to user equipment, or
  adding a flag in a message header used to carry the test payload tunneled to the second apparatus, or
  adding an instruction to the aggregation header to the user equipment, or
the test load instruction.

According to an example embodiment of the invention, the first apparatus further comprises means for requesting the report on the throughput from the second apparatus by using the stop signal or a dedicated report request signal, or requesting the report on the throughput from the user equipment by using the instruction added to the aggregation header.

According to an example embodiment of the invention, the first apparatus further comprises means for requesting a delivery report of a specific test data packet for calculating a round trip time (RTT) from the second apparatus by using the stop signal or a dedicated delivery report request signal, or requesting a delivery report of a specific test data packet for calculating a round trip time (RTT) from the user equipment by using an RTT instruction added to the aggregation header of the test data packet.

According to an example embodiment of the invention, the first apparatus further comprises means for requesting the report on the throughput and/or the delivery report during the test data session.

According to an implementation example of the invention, the means for signaling, determining, generating, sending, tunneling, adding and requesting are implemented by the processing resources 21 and memory resources 22. In addition, the interfaces 23 may be used for implementing the above features of the first apparatus.

According to a further aspect of the invention, second apparatus of a second network using a second radio access technology is provided. The second apparatus may comprise and/or use the control unit 30 shown in FIG. 1.

The second apparatus comprises means for sending, by the second apparatus, in an aggregation mode and in a test data session signaled by a first apparatus of a first network using a first radio access technology, test data packets to a user equipment associated with the second apparatus, wherein start and stop of the test data session is signaled by the first apparatus, wherein the test data packets comprise payload and an aggregation header including an indication that the payload comprises test data, wherein a report on a throughput based on the test data packets sent by the second apparatus is to be used for calculating a service level of the second apparatus.

According to an example embodiment of the invention, the second apparatus further comprises means for receiving, from the first apparatus, in the test data session data comprising test data, and means for generating the test data packets by including the test data as the payload and the aggregation header with the indication in the test data packets.

According to an example embodiment of the invention, the second apparatus further comprises means for receiving, from the first apparatus, a test load instruction instructing the second apparatus to generate the payload and the aggregation header of the test data packets.

According to an example embodiment of the invention, the second apparatus further comprises means for receiving a start signal signaling start of the test data session and a stop signal signaling stop of the test data session, or receiving a flag added into a message header used to carry the data tunneled, the flag indicating start and stop of the test data session, or receiving the test load instruction indicating start and stop of the test data session.

According to an example embodiment of the invention, the second apparatus further comprises means for providing the report on the throughput when receiving the stop signal requesting the report or a dedicated signal requesting the report, or providing the report on the throughput when last test data packet of the test data session has been delivered.

According to an example embodiment of the invention, the second apparatus further comprises means for providing a delivery report of a test data packet for calculating a round trip time (RTT) to the first apparatus based on delivery of a specific test data packet to the user equipment and/or based on reception of an acknowledgment packet acknowledging receipt of the specific test data packet.

According to an example embodiment of the invention, the second apparatus further comprises means for adding an instruction into the aggregation header based on the flag or the test load generation instruction, for signaling the start and stop of the test data session to the user equipment, and/or adding an instruction into the aggregation header based on a dedicated signal received from the first apparatus requesting the report on the throughput from the user equipment, and/or adding an RTT instruction into the aggregation header based on a dedicated delivery report request signal received from the first apparatus requesting the user equipment to provide a delivery report of a test data packet for calculating a round trip time (RTT).

According to an example embodiment of the invention, the second apparatus further comprises means for measuring actually achieved throughput during the test data session for sending the test data packets to the user equipment using the second radio access technology, and/or means for determining achieved modulation and coding scheme or last modulation and coding scheme used for sending the test data packets to the user equipment using the second radio access technology, and means for reporting the measured throughput and/or the determined achieved or last modulation and coding scheme to the first apparatus, and/or reporting transmitted byte count and/or a lost byte count for the test data session.

According to an implementation example of the invention, the means for sending, receiving, generating, providing, adding, measuring, determining and reporting are implemented by the processing resources 31 and memory resources 32. In addition, the interfaces 33 may be used for implementing the above features of the second apparatus.

According to a further aspect of the invention, a user equipment capable of communicating using a first radio access technology and a second radio access technology is provided. The user equipment may comprise and/or use the control unit 10 shown in FIG. 1.

The user equipment comprises means for receiving, from a second apparatus of a second network using the second radio access technology, test data packets for the user equipment in an aggregation mode and in a test data session signaled by a first apparatus of a first network using the first radio access technology, wherein the test data packets comprise payload and an aggregation header including an indication that the payload is test data, wherein a report on a throughput based on the test data packets sent by the second apparatus is to be used for calculating a service level of the user equipment with respect to the second apparatus.

According to an example embodiment of the invention, the user equipment further comprises means for providing the report on the throughput when receiving an instruction included in the aggregation header, the instruction requesting the report, or when receiving a dedicated signal requesting the report, or providing the report on the throughput when last test data packet of the test data session has been received.

According to an example embodiment of the invention, the user equipment further comprises means for providing a delivery report of a test data packet for calculating a round trip time (RTT) to the first apparatus when receiving an instruction included in the aggregation header, the instruction requesting the delivery report.

According to an example embodiment of the invention, the user equipment further comprises means for transmitting the report to the first apparatus directly or via the second apparatus.

According to an example embodiment of the invention, the user equipment further comprises means for measuring actually achieved throughput during the test data session for receiving the test data packets from the second apparatus using the second radio access technology, and/or means for determining achieved modulation and coding scheme or last modulation and coding scheme used for receiving the test data packets from the second apparatus using the second radio access technology, and means for reporting the measured throughput and/or the determined achieved or last modulation and coding scheme to the first apparatus, and/or reporting transmitted byte count and/or a lost byte count in the test data session.

According to an example embodiment of the invention, the user equipment further comprises means for discarding the payload contained in the test data packets based on the indication indicating test data.

According to an example embodiment of the invention, the user equipment further comprises means for updating statistics with respect to the test data packets before discarding the payload.

According to an implementation example of the invention, the means for receiving, providing, transmitting, measuring, determining, reporting, discarding and updating are implemented by the processing resources 11 and memory resources 12. In addition, the interfaces 13 may be used for implementing the above features of the user equipment.

According to an example embodiment of the invention, the above-described indication comprises a value set in a data field added into the aggregation header.

According to another example embodiment of the invention, the indication comprises a predetermined or unused bearer identification set in a bearer identification field of the aggregation header or a predetermined aggregation mode value set in an aggregation mode field of the aggregation header.

According to an example embodiment of the invention, the report on the throughput signals, to the first node, end of test data transmission with respect to the second node.

According to an example embodiment of the invention, the first node comprises an eNodeB or a radio network controller or other current or future third generation partnership project (3GPP) and non-3GPP radio network node and/or the first network comprises a network according to other current or future 3GPP and non-3GPP network.

According to an example embodiment of the invention, the second node comprises an access point of a wireless local area network (WLAN) and/or the second network comprises the wireless local area network and/or the second radio access technology comprises a technology according to wireless fidelity standard.

According to an example embodiment of the invention, the aggregation header is added into an L2 layer as WLAN logical link control payload, or into higher protocol layers if the user equipment has such a protocol layer address assigned like an internet protocol (IP) address in the WLAN and the aggregation header is added into such a protocol layer, like an IP layer.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A first apparatus of a first network using a first radio access technology, the first apparatus comprising at least one processor and at least one memory including computer program code, the at least one memory and the computer program code configured to, with the at least one processor, cause the first apparatus at least to perform:
   signaling a second apparatus of a second network using a second radio access technology start and stop of a test data session and to send test data packets to a user equipment in an aggregation mode via the second apparatus in the test data session, the user equipment being associated with the second apparatus, wherein the test data packets comprise payload and an aggregation header including an indication that the payload comprises test data; and determining a service level of the user equipment with respect to the second apparatus based on a report on a throughput of the test data packets sent by the second apparatus in the test data session.

2. The first apparatus of claim 1, wherein the at least one memory and the computer program code are configured to, with the at least one processor, cause the first apparatus to perform:

generating the test data packets including the payload and the aggregation header including the indication; and sending the test data packets to the user equipment via the second apparatus.

3. The first apparatus of claim 1, wherein the at least one memory and the computer program code are configured to, with the at least one processor, cause the first apparatus to perform:

tunneling data to the second apparatus to be delivered to the user equipment, the data indicating to the second apparatus that the data comprises test data, wherein the data is real end user data and the aggregation header indicates that the data belongs to the test data session for measuring throughput and/or round trip time (RTT), or the data is random test data to be used for throughput and/or RTT measurement and to be deleted locally.

4. The first apparatus of claim 1, wherein the at least one memory and the computer program code are configured to, with the at least one processor, cause the first apparatus to perform:

signaling a test load instruction to the second apparatus instructing the second apparatus to generate the payload and the aggregation header of the test data packets.

5. The first apparatus of claim 1, wherein the at least one memory and the computer program code are configured to, with the at least one processor, cause the first apparatus to perform:

signaling the start and stop of the test data session to the second apparatus or to the user equipment by sending a start signal and a stop signal to the second apparatus or to user equipment, or adding a flag in a message header used to carry the test payload tunneled to the second apparatus, or adding an instruction to the aggregation header to the user equipment, or the test load instruction.

6. The first apparatus of claim 5, wherein the at least one memory and the computer program code are configured to, with the at least one processor, cause the first apparatus to perform:

requesting the report on the throughput from the second apparatus by using the stop signal or a dedicated report request signal, or requesting the report on the throughput from the user equipment by using the instruction added to the aggregation header.

7. The first apparatus of claim 1, wherein the at least one memory and the computer program code are configured to, with the at least one processor, cause the first apparatus to perform:

requesting a delivery report of a specific test data packet for calculating a round trip time (RTT) from the second apparatus by using the stop signal or a dedicated delivery report request signal, or requesting a delivery report of a specific test data packet for calculating a round trip time (RTT) from the user equipment by using an RTT instruction added to the aggregation header of the test data packet.

8. The first apparatus of claim 7, wherein the at least one memory and the computer program code are configured to, with the at least one processor, cause the first apparatus to perform:

requesting the report on the throughput and/or the delivery report during the test data session.

9. A second apparatus of a second network using a second radio access technology, the second apparatus comprising at least one processor and at least one memory including computer program code, the at least one memory and the computer program code configured to, with the at least one processor, cause the second apparatus at least to perform:

sending, by the second apparatus, in an aggregation mode and in a test data session signaled by a first apparatus of a first network using a first radio access technology, test data packets to a user equipment associated with the second apparatus, wherein start and stop of the test data session is signaled by the first apparatus, wherein the test data packets comprise payload and an aggregation header including an indication that the payload comprises test data, wherein a report on a throughput based on the test data packets sent by the second apparatus is to be used for calculating a service level of the second apparatus.

10. The second apparatus of claim 9, wherein the at least one memory and the computer program code are configured to, with the at least one processor, cause the second apparatus to perform:

receiving, from the first apparatus, in the test data session data comprising test data; and generating the test data packets by including the test data as the payload and the aggregation header with the indication in the test data packets.

11. The second apparatus of claim 9, wherein the at least one memory and the computer program code are configured to, with the at least one processor, cause the second apparatus to perform:

receiving, from the first apparatus, a test load instruction instructing the second apparatus to generate the payload and the aggregation header of the test data packets.

12. The second apparatus of claim 9, wherein the at least one memory and the computer program code are configured to, with the at least one processor, cause the second apparatus to perform:

receiving a start signal signaling start of the test data session and a stop signal signaling stop of the test data session, or receiving a flag added into a message header used to carry the data tunneled, the flag indicating start and stop of the test data session, or receiving the test load instruction indicating start and stop of the test data session.

13. The second apparatus of claim 12, wherein the at least one memory and the computer program code are configured to, with the at least one processor, cause the second apparatus to perform:

providing the report on the throughput when receiving the stop signal requesting the report or a dedicated signal requesting the report, or providing the report on the throughput when last test data packet of the test data session has been delivered.

14. A user equipment capable of communicating using a first radio access technology and a second radio access technology, the user equipment comprising at least one processor and at least one memory including computer program code, the at least one memory and the computer program code configured to, with the at least one processor, cause the user equipment at least to perform:

receiving, from a second apparatus of a second network using the second radio access technology, test data packets for the user equipment in an aggregation mode and in a test data session signaled by a first apparatus of a first network using the first radio access technology, wherein the test data packets comprise payload and an aggregation header including an indication that the payload is test data, wherein a report on a throughput based on the test data packets sent by the second apparatus is to be used for calculating a service level of the user equipment with respect to the second apparatus.

15. The user equipment of claim 14, wherein the at least one memory and the computer program code are configured to, with the at least one processor, cause the user equipment to perform:

providing the report on the throughput when receiving an instruction included in the aggregation header, the instruction requesting the report, or when receiving a dedicated signal requesting the report, or providing the report on the throughput when last test data packet of the test data session has been received.

16. The user equipment of claim 14, wherein the at least one memory and the computer program code are configured to, with the at least one processor, cause the user equipment to perform:

providing a delivery report of a test data packet for calculating a round trip time (RTT) to the first apparatus when receiving an instruction included in the aggregation header, the instruction requesting the delivery report.

17. The user equipment of claim 15, wherein the at least one memory and the computer program code are configured to, with the at least one processor, cause the user equipment to perform:

transmitting the report to the first apparatus directly or via the second apparatus.

18. The user equipment of claim 14, wherein the at least one memory and the computer program code are configured to, with the at least one processor, cause the user equipment to perform:

measuring actually achieved throughput during the test data session for receiving the test data packets from the second apparatus using the second radio access technology, and/or determining achieved modulation and coding scheme or last modulation and coding scheme used for receiving the test data packets from the second apparatus using the second radio access technology; and reporting the measured throughput and/or the determined achieved or last modulation and coding scheme to the first apparatus, and/or reporting transmitted byte count and/or a lost byte count in the test data session.

19. The user equipment of claim 14, wherein the at least one memory and the computer program code are configured to, with the at least one processor, cause the user equipment to perform:

discarding the payload contained in the test data packets based on the indication indicating test data.

20. The user equipment of claim 19, wherein the at least one memory and the computer program code are configured to, with the at least one processor, cause the user equipment to perform:

updating statistics with respect to the test data packets before discarding the payload.

* * * * *